(12) United States Patent
Hutchison et al.

(10) Patent No.: US 11,353,671 B2
(45) Date of Patent: Jun. 7, 2022

(54) FIBER DISTRIBUTION HUB WITH SWIVELING FRAME BODY

(71) Applicant: PPC BROADBAND, INC., East Syracuse, NY (US)

(72) Inventors: Randall D. Hutchison, Shawnee, KS (US); Robert Schiffbauer, Olathe, KS (US)

(73) Assignee: PPC BROADBAND, INC., East Syracuse, NY (US)

(*) Notice: Subject to any disclaimer, the term of this patent is extended or adjusted under 35 U.S.C. 154(b) by 0 days.

(21) Appl. No.: 16/834,536

(22) Filed: Mar. 30, 2020

(65) Prior Publication Data

US 2020/0310063 A1    Oct. 1, 2020

Related U.S. Application Data

(60) Provisional application No. 62/825,333, filed on Mar. 28, 2019.

(51) Int. Cl.
  *G02B 6/00* (2006.01)
  *G02B 6/44* (2006.01)
  *H04Q 1/02* (2006.01)
  *G02B 6/38* (2006.01)

(52) U.S. Cl.
  CPC .......... *G02B 6/4452* (2013.01); *H04Q 1/133* (2013.01); *G02B 6/3897* (2013.01); *H04Q 1/131* (2013.01)

(58) Field of Classification Search
  CPC ...... G02B 6/4452; G02B 6/3897; G02B 6/00; H04Q 1/133; H04Q 1/131
  See application file for complete search history.

(56) References Cited

U.S. PATENT DOCUMENTS

| 7,277,273 | B2* | 10/2007 | Smith | H05K 7/1488 |
| | | | | 211/26 |
| 8,019,192 | B2* | 9/2011 | Puetz | H04Q 1/064 |
| | | | | 385/135 |
| 9,810,868 | B2 | 11/2017 | Puetz et al. | |
| 10,067,308 | B2* | 9/2018 | Smith | G02B 6/4285 |
| 2017/0020025 | A1 | 1/2017 | Huang et al. | |
| 2019/0104638 | A1 | 4/2019 | Shimasaki | |

OTHER PUBLICATIONS

International Search Report and Written Opinion issued in International Patent Application No. PCT/US20/25749 dated Jul. 9, 2020 (8 pages).

* cited by examiner

*Primary Examiner* — Jennifer Doan
(74) *Attorney, Agent, or Firm* — MH2 Technology Law Group LLP

(57) ABSTRACT

A fiber distribution hub configured to house a patch panel includes a plurality of walls forming a chamber, a first shelf attached to a first wall of the plurality of walls in the chamber, a first track supported by the first shelf, and a frame body configured to support the patch panel and to be coupled with the first shelf via the first track. The frame body is configured to shift along the first track between a stored position, a front-exposed position, and a back-exposed position.

20 Claims, 10 Drawing Sheets

FIBER DISTRIBUTION HUB WITH SWIVELING FRAME BODY

CROSS-REFERENCE TO RELATED APPLICATION

This nonprovisional application claims the benefit of U.S. Provisional Application No. 62/825,333, filed Mar. 28, 2019. The disclosure of the prior application is hereby incorporated by reference herein in its entirety.

TECHNICAL FIELD

The present disclosure generally relates to cabinets for storing information and communication system components.

BACKGROUND

Patch panels used in information and communication systems are often densely packed in small cabinets in small storage spaces, such as huts or data centers. Service technicians often have to access the patch panels to service, maintain, test, modify, and/or configure them. This may entail removing panels from the cabinet, adding panels, plugging new fibers into the patch panels, and/or removing fibers. Accessing the cabinets in such small places and accessing cards within densely packed cabinets is difficult and tedious.

The background discussion is intended to provide information related to the present disclosure which is not necessarily prior art.

SUMMARY

In accordance with various embodiments of the present disclosure, a fiber distribution hub configured to house patch panels includes a plurality of walls forming a chamber, a door hingedly attached to one of the plurality of walls, a first shelf attached to a second wall of the plurality of walls, a first pair of tracks configured to be supported on the first shelf and comprising portions that are parallel to one another and portions that are convergent to one another, a second shelf attached to the second wall, a second pair of tracks configured to be supported on the second shelf and comprising portions that are parallel to one another and portions that are convergent to one another, and a frame body configured to shift between a stored position, a front-exposed position, and a back-exposed position. The frame body includes a frame for attaching patch panels and having a top portion, a bottom portion, a front portion that protrudes from the chamber when the frame body is in the front-exposed position, and a back portion that protrudes from the chamber when the frame body is in the back-exposed position, a pair of top pivot pins attached to the top portion of the frame, a pair of bottom pivot pins attached to the bottom portion of the frame, and a cable shelf attached to the top portion of the frame above the first shelf. The pair of top pivot pins are configured to be slidingly engaged with the first pair of track, the pair of bottom pivot pins are configured to be slidingly engaged with the second pair of tracks, and the cable shelf are configured to support fiber optic cables connected to the patch panels away from a path of the frame body.

According to some embodiments of the disclosure, a fiber distribution hub configured to house a patch panel includes a plurality of walls forming a chamber, a first shelf attached to a first wall of the plurality of walls in the chamber, a first track supported by the first shelf, and a frame body configured to support the patch panel and to be coupled with the first shelf via the first track. The frame body is configured to shift along the first track between a stored position, a front-exposed position, and a back-exposed position.

In some aspects of the fiber distribution hub, a cable wrap is attached to a second wall of the plurality of walls inside the chamber.

According to various aspects of the fiber distribution hub, a door is hingedly attached to one of the plurality of walls.

In various aspects of the fiber distribution hub, a power outlet is positioned in the inner chamber.

According to some aspects, the fiber distribution hub includes a second shelf attached to the first wall and a second track supported by the second shelf, and the frame body is at least partially supported by the second shelf via the second track.

In some aspects of the fiber distribution hub, the frame body includes a frame for attaching the patch panel and having a top portion, a bottom portion, a front portion that protrudes from the chamber when the frame body is in the front-exposed position, and a back portion that protrudes from the chamber when the frame body is in the back-exposed position.

According to various aspects, the frame body includes a top pivot pin attached to the top portion of the frame, and the top pivot pin is configured to be slidingly engaged with the first track.

In various aspects of the fiber distribution hub, the frame body includes a bottom pivot pin attached to the bottom portion of the frame, and the bottom pivot pin is configured to be slidingly engaged with the second track.

According to some aspects of the fiber distribution hub, the frame body includes a cable shelf attached to the top portion of the frame above the first shelf, and the cable shelf is configured to support a fiber connected to the patch panel away from a path of the frame body.

In some aspects of the fiber distribution hub, the cable shelf is configured to define a space below the cable shelf that is wide enough to surround the first shelf when the frame body shifts to the stored position.

According to various aspects of the fiber distribution hub, the first track includes a pair of slots.

In various aspects of the fiber distribution hub, the first track comprises two parts including portions that are convergent.

According to various aspects of the disclosure, a frame support assembly configured to support a patch panel includes a first shelf, a first track supported by the first shelf, and a frame body configured to support the patch panel and to be coupled with the top shelf via the first track. The frame body is configured to shift along the first track between a stored position, a front-exposed position, and a back-exposed position.

The present disclosure solves the above-described problems and other problems and provides a distinct advance in the art of fiber distribution hubs for information and communication systems. In some aspects, the present disclosure provides a fiber distribution hub that is smaller and efficiently occupies space while still providing access to patch panels and other components therein.

In the embodiments described herein, the frame body is configured to support one or more patch panels and to be engaged with the first shelf via the first track, and the frame body is configured to shift along the track between a stored position, a front-exposed position, and a back-exposed position. By being shiftable between these positions, the frame body occupies less space when in the stored position. This enables the cabinet to be smaller in size, which allows for more space-efficient installation. Additionally, by being able to shift between a front-exposed position and a back-exposed position, both sides of the patch panels are accessible without occupying too much additionally space when in said positions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the disclosure described herein.

DETAILED DESCRIPTION

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 10:
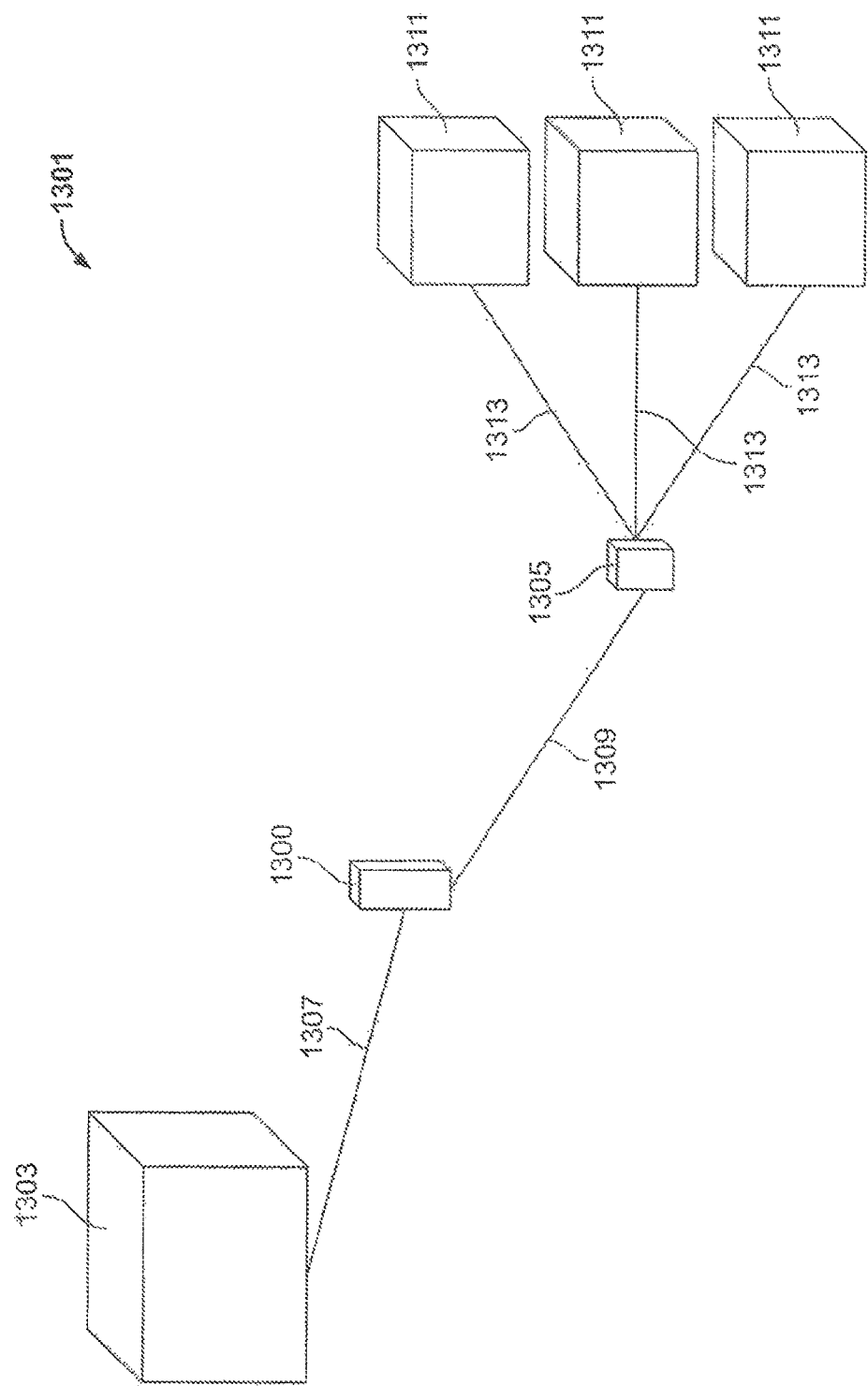
FIG. 10 is a schematic illustration of a fiber distribution system using a fiber distribution hub.

FIG. 10 schematically illustrates a fiber optic distribution system 1301. As shown in FIG. 10, fiber optic distribution system 1301 can include a service provider location 1303 and one or more access terminals 1305. Service provider location 1303 may be a service provider central office or a local service provider supply location. A fiber distribution hub (FDH) 1300 optically couples service provider location 1303 to access terminal 1305. FDH 1300 can receive one or more multi-fiber feeder cables 1307 from service provider location 1303. FDH 1300 provides optical signals to end users 1311 by one or more distribution cables 1309 that interface access terminal 1305. End users 1311 receive the optical signals from access terminal 1305 through one or more drop cables 1313. A person skilled in the relevant art would understand FDH 1300 can be used in fiber optic distribution systems that vary from the one illustrated in FIG. 10. For example, FDHs can be used in high fiber density applications such as data centers.

Figure 1:
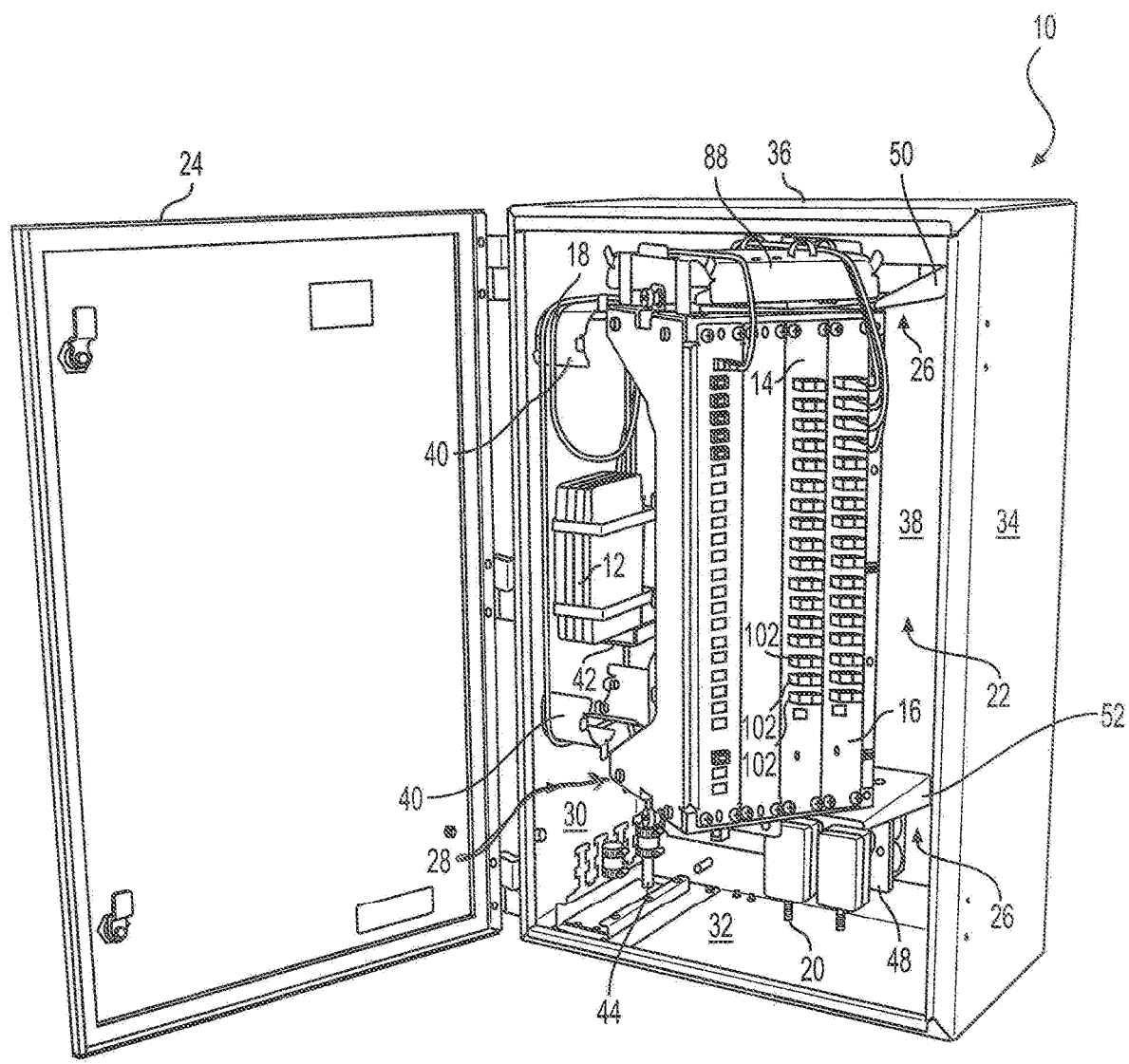
FIG. 1 is a perspective view of a fiber distribution hub constructed in accordance with an embodiment of the present disclosure.

FIG. 1 illustrates an exemplary fiber distribution hub 10 in accordance with various aspects of the disclosure. The fiber distribution hub 10 constructed according to embodiments of the present disclosure may be used to store various electronic and fiber optic equipment. The electronic and fiber optic equipment may include one or more devices 12 and one or more patch panels 14, 16 with one or more fiber optic cables 18 and/or electronic wires 20 connected thereto. The cabinet 10 may be installed on a wall or other surface and broadly comprises a number of walls (described below) that define an interior chamber 22, a door 24 that closes or provides access to the chamber 22, a frame body support system 26, and a frame body 28.

The walls may include a left-side wall 30, a bottom wall 32, a right-side wall 34, a top wall 36, and a back wall 38 that together form a box-like structure which encloses the chamber 22. One or more cable wraps 40 and a device shelf 42 may be mounted to the left-side wall 30 inside the chamber 22. The fiber optic cables 18 may be wrapped around the cable wraps 40 for storage purposes. The device shelf 42 provides support for one or more devices 12. The bottom wall 32 may include a fiber optic cable port 44 for receiving a fiber optic cable 46 from outside the chamber. An electrical outlet 48 connected to an external power source (not shown) may be mounted on the back wall 38 for connecting one or more of the patch panels 14, 16 and/or the device 12 to the power source.

The door 24 is pivotally connected to the left-side wall 30 via a hinge or other connection and is shiftable between opened and closed positions. While the figures depict the cabinet 10 forming a box-like structure, the cabinet 10 may form any number of shapes and have any number of walls without departing from the scope of the present disclosure.

Figure 2:
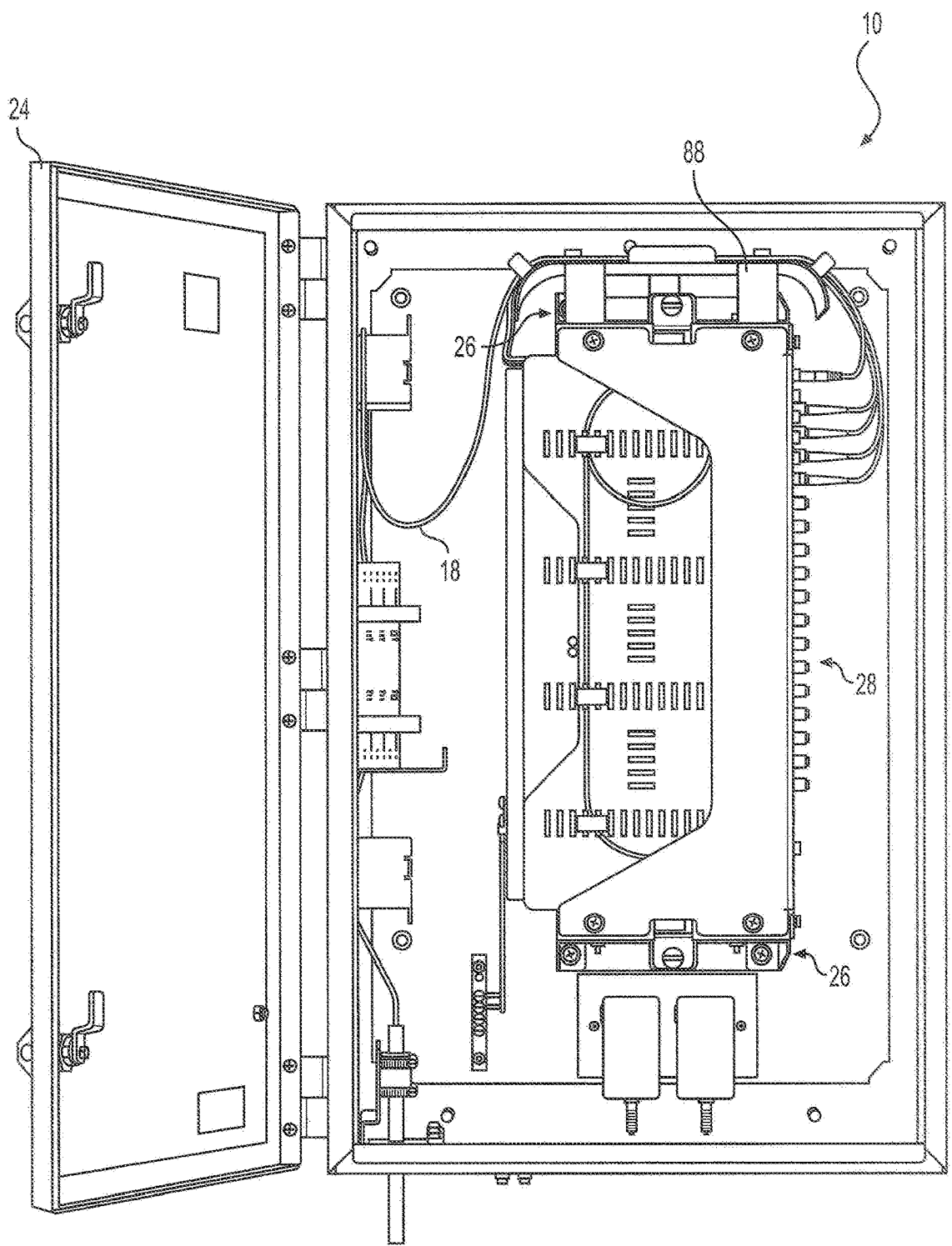
FIG. 2 is a front perspective view of the fiber distribution hub of FIG. 1 with a frame body in a stored position.
Figure 3:
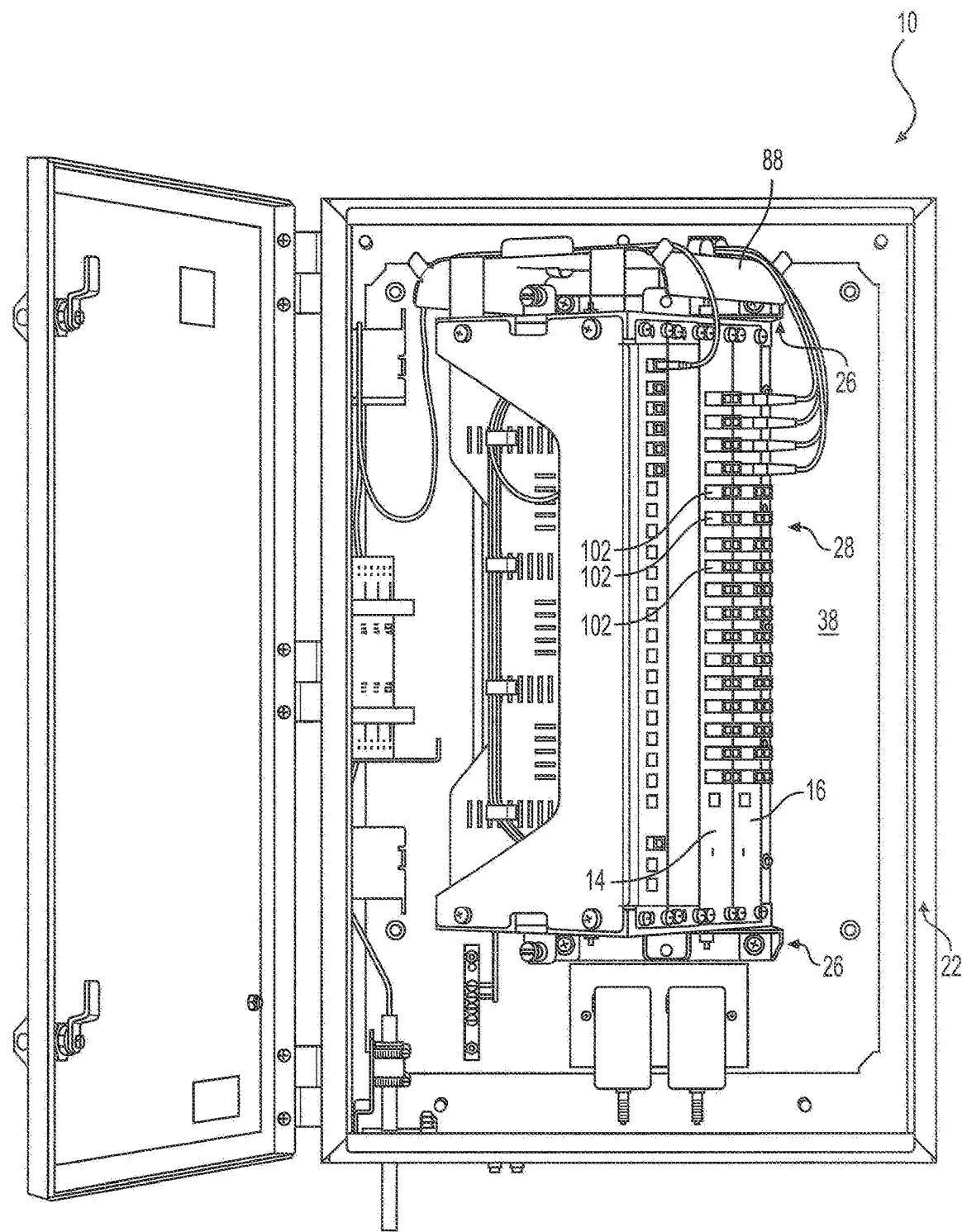
FIG. 3 is a front perspective view of the fiber distribution hub of FIG. 1 with the frame body in a front-exposed position.
Figure 4:
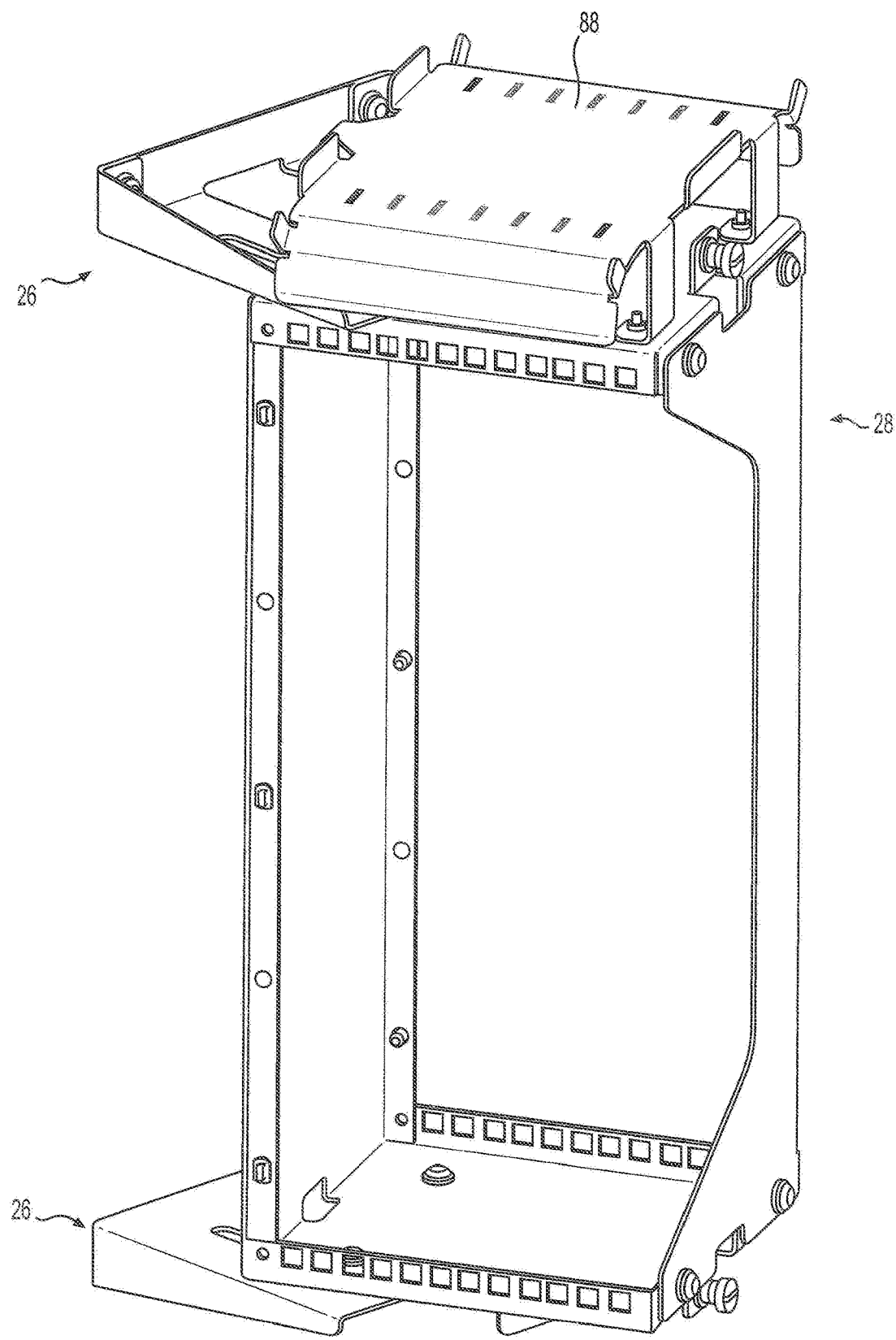
FIG. 4 is a perspective view of the frame body of FIG. 1 in a back-exposed position.

The frame body support system 26 is attached to the back wall 38 and supports the frame body 28 so that the frame body 28 is shiftable between a stored position (as illustrated in FIG. 2), a front-exposed position (as illustrated in FIG. 3), and a back-exposed position (as illustrated in FIG. 4).

Figure 5:
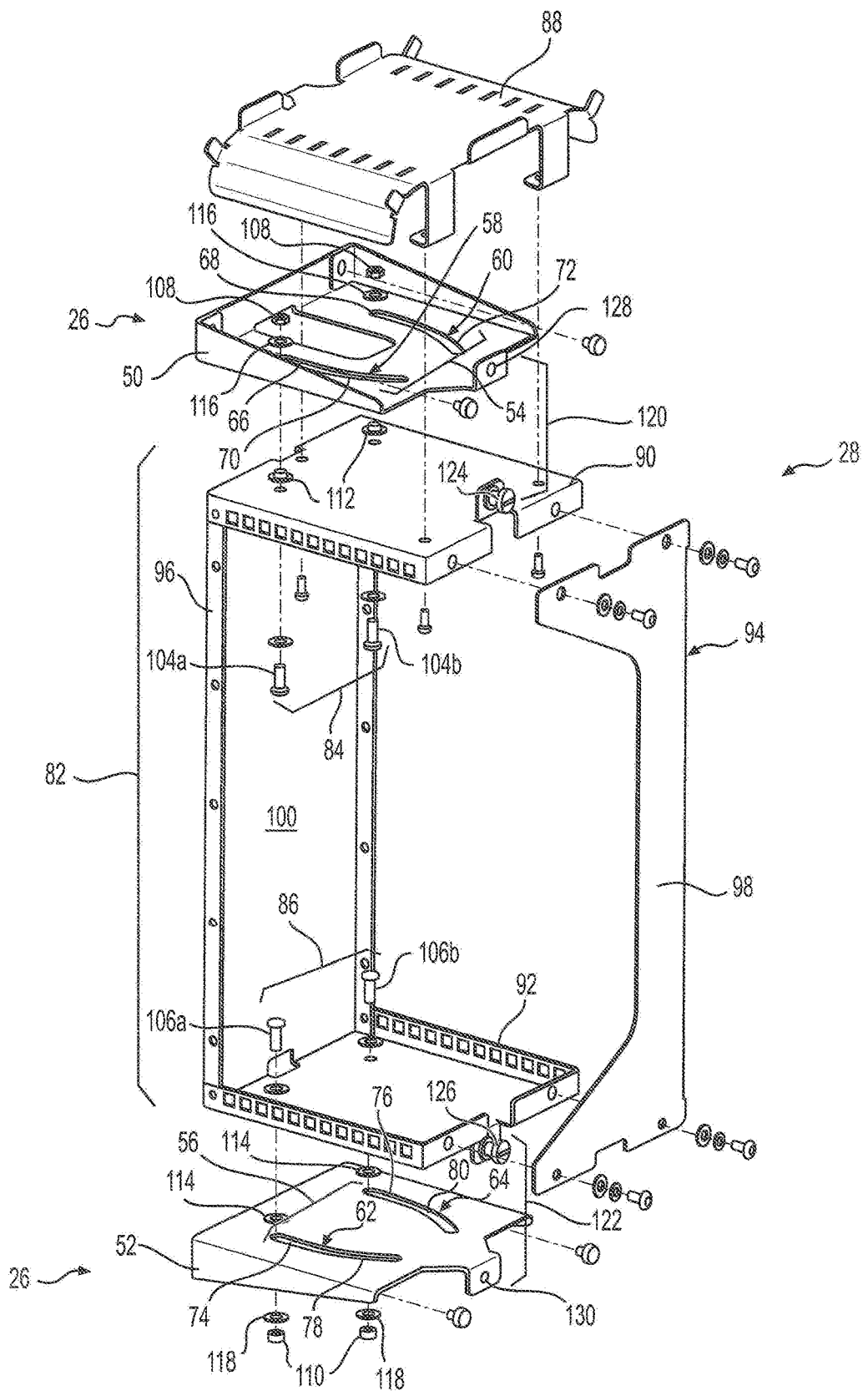
FIG. 5 is an exploded perspective view of the frame body of FIG. 4.

Turning to FIG. 5, the frame body support system 26 may comprise a top shelf 50, a bottom shelf 52, and tracks 54, 56 supported on the shelves 50, 52. The tracks 54, 56 are configured to guide the frame body 28 to shift from the stored position, the front-exposed position, and the back-exposed position. The track 54 on the top shelf 50 may mirror the track 56 on the bottom shelf 52. The tracks 54, 56 may be attached to the shelves 50, 52 or incorporated thereto. For example, each track 54, 56 may comprise a pair of slots 58, 60, 62, 64 or grooves that receive portions of the frame body 28. The slots 58, 60 of the first track 54 may include portions 66, 68 that are parallel to one another. The slots 58, 60 of the first track 54 may also include portions 70, 72 that are convergent to one another. Likewise, the slots 62, 64 of the second track 56 may include portions 74, 76 that are parallel to one another and portions 78, 80 that are convergent to one another. The parallel portions 66, 68, 74, 76 allow the frame body 28 to shift out of the chamber 22 a distance. The convergent portions 70, 72, 78, 80 allow the frame body 28 to shift to either the front-exposed position or the back-exposed position. However, it is foreseen that the tracks 54, 56 may take any shape without departing from the scope of the present disclosure. For example, the slots 58, 60, 62, 64 may form opposing semi-circular lines.

Figure 6:
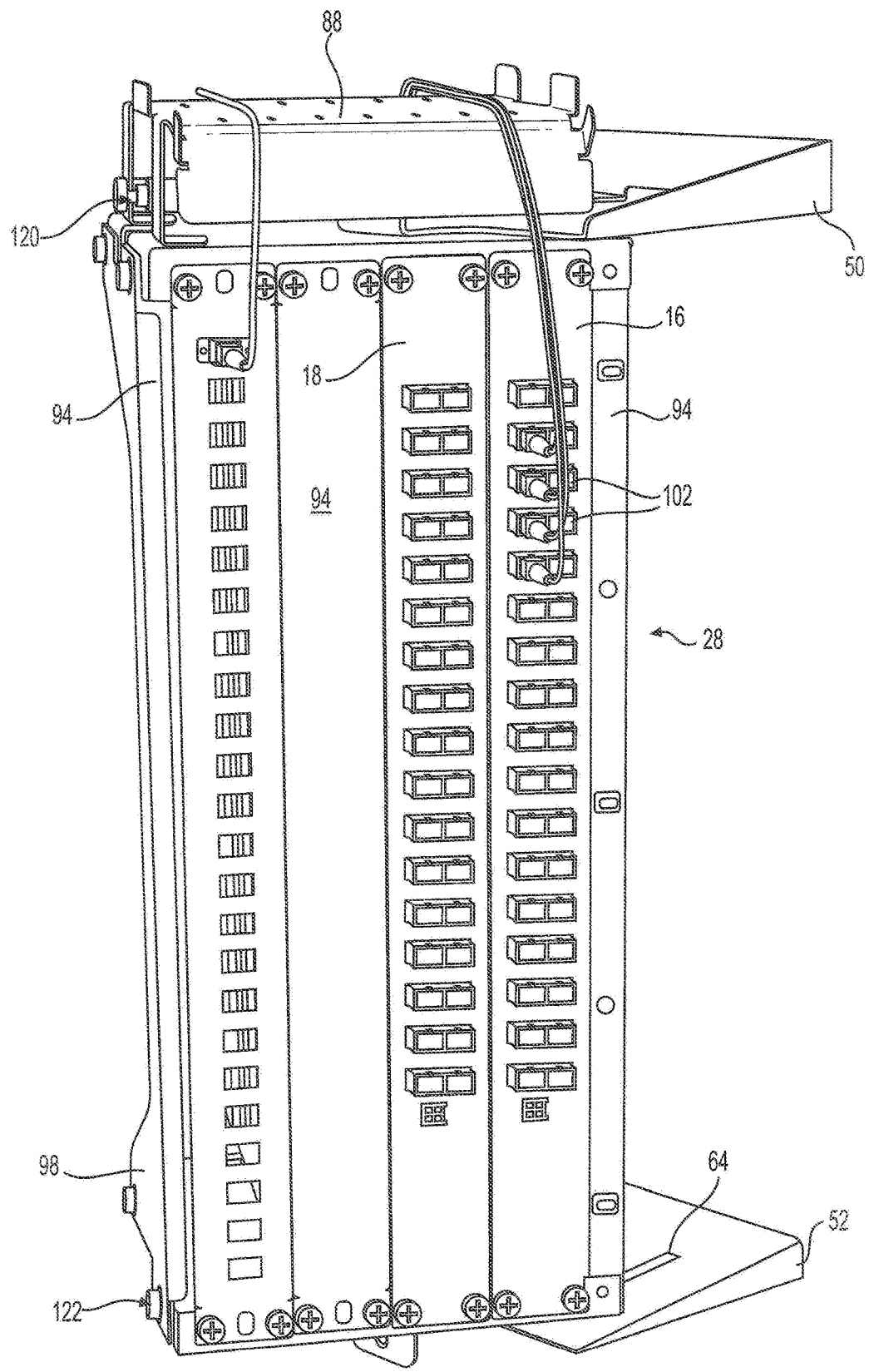
FIG. 6 is a perspective view of the frame body of FIG. 4.
Figure 7:
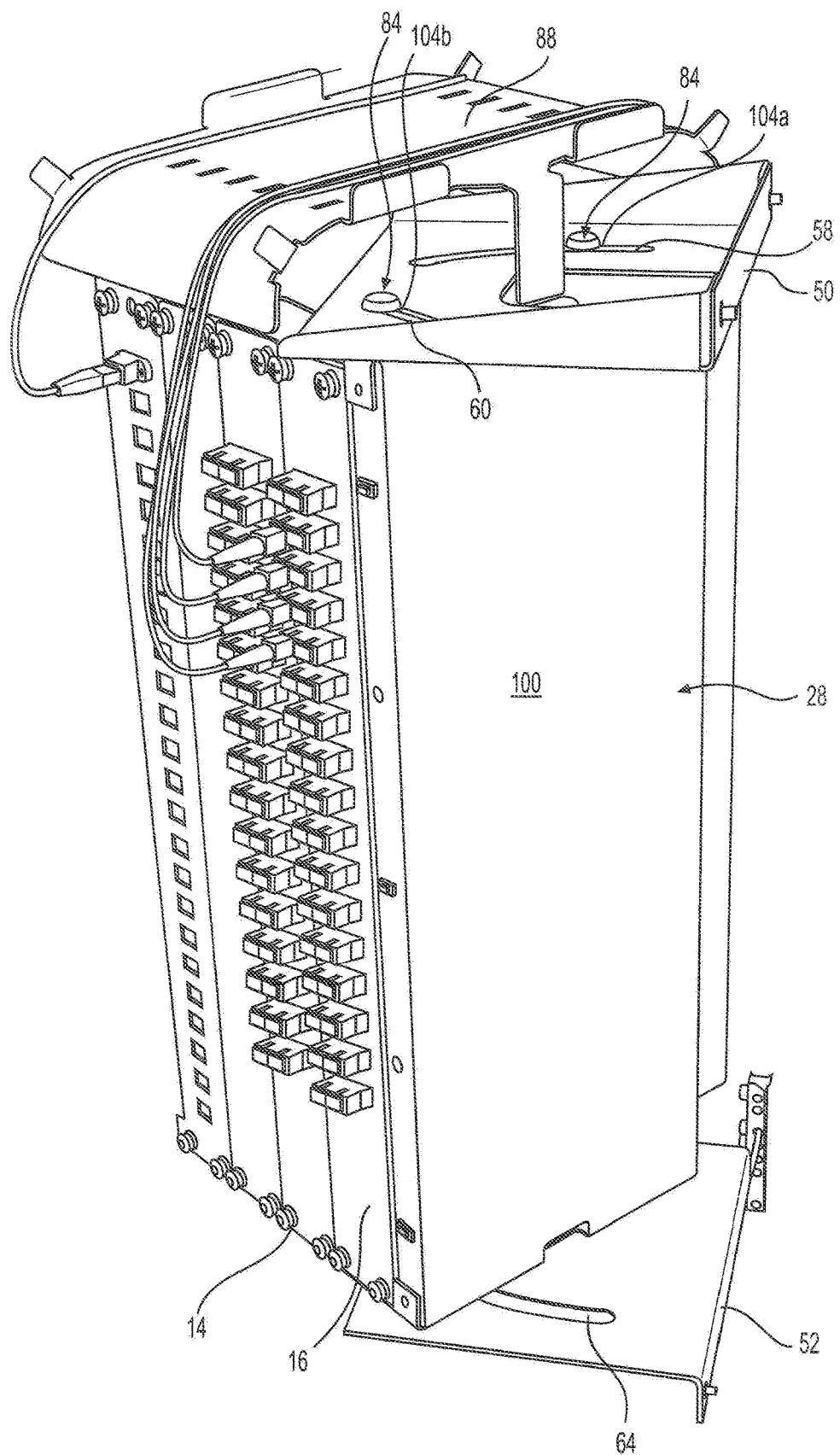
FIG. 7 is a right-side perspective view of the frame body of FIG. 4.
Figure 8:
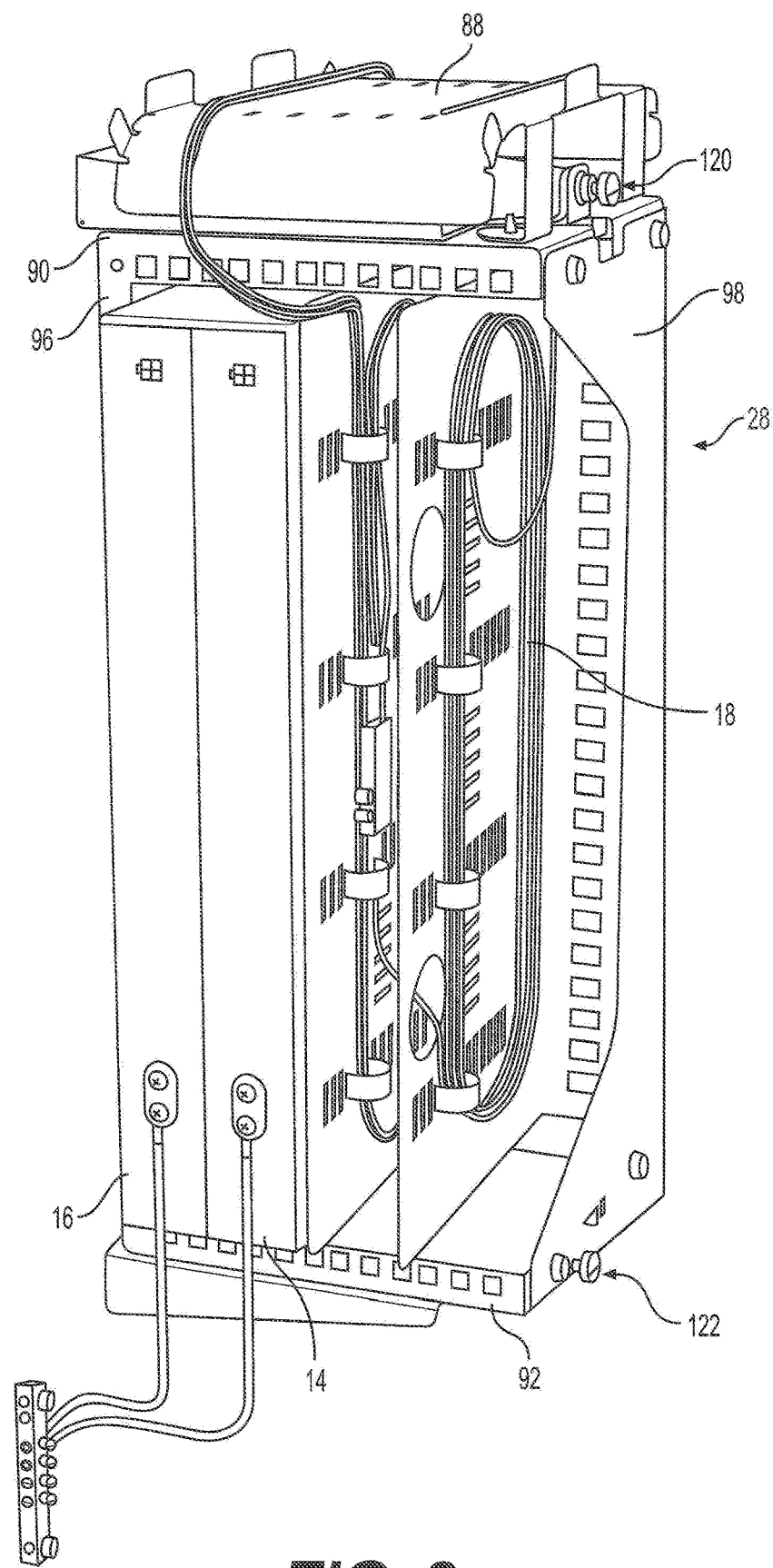
FIG. 8 is a left-side perspective view of the frame body of FIG. 4.
Figure 9:
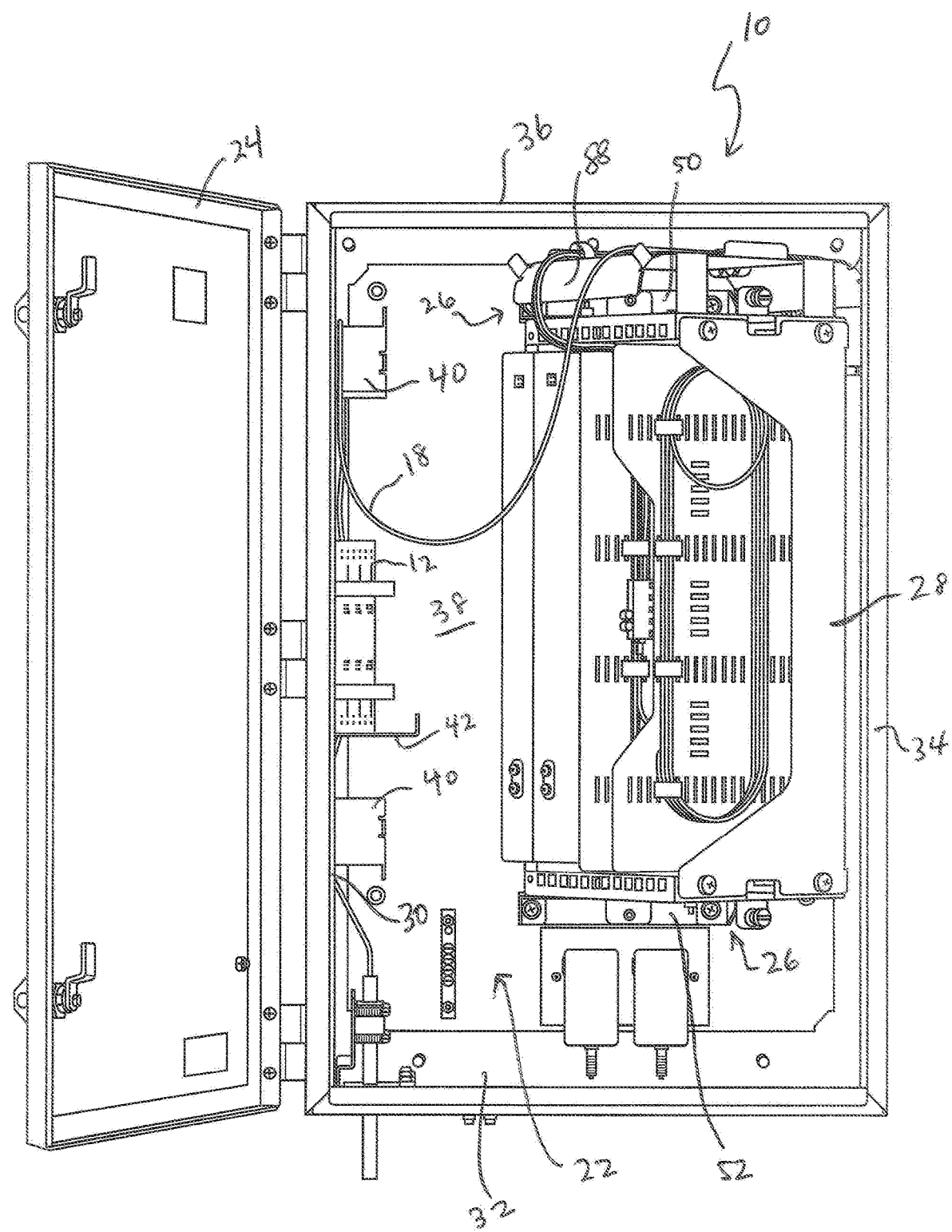
FIG. 9 is a front perspective view of the fiber distribution hub of FIG. 1 with the frame body in a back-exposed position.

The frame body 28 is supported on the cage support system 26 and is shiftable between the stored position, the front-exposed position, and the back-exposed position. The frame body 28 may comprise a frame 82, a top engagement mechanism 84, a bottom engagement mechanism 86, and a cable shelf 88. The frame 82 supports the patch panels 14, 16 and may include a top portion 90, a bottom portion 92, a front portion 94, a back portion 96, and side portions 98, 100. The patch panels 14, 16 may be attached to the front portion 94 of the frame 82 so that a plurality of fiber ports 102 are accessible at the front portion 94, as illustrated in FIGS. 6 and 7. The patch panels 14, 16 may extend from the front portion 94 to the back portion 96 so that the back of the patch panels 14, 16 are accessible at the back portion 96 (the back-exposed position of the frame body 28 being illustrated in FIG. 4, and the backsides of the patch panels 14, 16 being illustrated in FIG. 8).

The top engagement mechanism 84 is attached to the top portion 90 of the frame 82, and the bottom engagement mechanism 86 is attached to the bottom portion 92 of the frame 82. The engagement mechanisms 84, 86 may comprise any configuration that movably engages their respective tracks 54, 56 of the frame body support system 26 so that the frame body 28 is shiftable between the stored position, the front-exposed position, and the back-exposed position. For example, as illustrated, the engagement mechanisms 84, 86 may comprise pairs of fasteners 104a, 104b, 106a, 106b extending through the slots 58, 60, 62, 64 and fastened to pairs of nuts 108, 110. In this embodiment, the fasteners 104a, 104b, 106a, 106b may be moved along the parallel portions 66, 68, 74, 76 of the slots 58, 60, 62, 64 so that the frame body 28 shifts out from the stored position a distance. Then the either fasteners 104a, 106a or fasteners 104b, 106b may be moved along the convergent portions 70, 72, 78, 80 of the slots 58, 60, 62, 64. Specifically, when the frame body 28 is moved to the front-exposed position, the fasteners 104b, 106b move along their respective convergent portions 72, 80. When the frame body 28 is moved to the back-exposed position, the fasteners 104a, 106a move along their respective convergent portions 70, 78. This allows the frame body 28 to be in the front-exposed or back-exposed positions without occupying too much additional space, which is important and useful when the cabinet 10 is placed in small, difficult-to-reach spaces.

A friction-reducing system 112 may be used to reduce friction between the engagement mechanisms 84, 86 and the tracks 54, 56. For example, pairs of shoulder washers 112, 114 may be positioned between the portions 90, 92 of the frame 82 and the shelves 50, 52 and configured to receive the fasteners 104a, 104b, 106a, 106b. The shoulder washers 112, 114 may be made of any material that reduces friction, such as non-metal material, plastic, or the like. Additionally, friction-reducing washers 116, 118 may be positioned between the nuts 108, 110 and the shelves 50, 52 to reduce friction between the nuts 108, 110 and the shelves. The washers 116, 118 may also receive the fasteners 104a, 104b, 106a, 106b and be made of any material that reduces friction, such as non-metal material, plastic, or the like.

The cable shelf 88 is attached to the top portion 90 and supports fiber optic cables 18 connected to the fiber ports 102 so that the fiber optic cables 18 stay out of the path of the shifting frame body 28. The cable shelf 88 may be attached to the front portion 94 and the back portion 96 and define a space wide enough below the cable shelf 88 so that the cable shelf 88 moves around the top shelf 50 when the frame body 28 is shifting positions.

The cabinet 10 may also include locking mechanisms 120, 122 that are configured to hold the frame body 28 in the stored position. The locking mechanisms 120, 122 may be attached to the side portion 98 and include biased latching devices 124, 126 that engage receivers 128, 130 connected to the shelves 50, 52. The latching devices 124, 126 may comprise spring-biased bolts, and the receivers 128, 130 may comprise threaded openings to which the spring-biased bolts may be engaged. However, the locking mechanisms 120, 122 may comprise any number of devices and/or configurations without departing from the scope of the present disclosure.

The cabinet 10 may include additional or less features than those described above without departing from the scope of the present disclosure. For example, the frame body 28 may be mounted directly to a wall or other surface via one or more of the shelves 50, 52 and not be enclosed by the door 24 and walls 30, 32, 34, 36, 38.

In use, the door 24 of the cabinet 10 may be opened to access the frame body 28. The frame body 28 may be in the stored position in which the fasteners 104a, 104b, 106a, 106b are in the parallel portions 66, 68, 74, 76 of the slots 58, 60, 62, 64. The locking mechanisms 84, 86 may be locked, i.e., the latching devices 124, 126 may be engaged with the receivers 128, 130.

To access the front portion 94 of the frame body 28 and therefore the fiber ports 102 of the patch panels 14, 16, the locking mechanisms 84, 86 may be unlocked, i.e., the latching devices 124, 126 may be disengaged from the receivers 128, 130. The frame body 28 may be shifted to the front-exposed position. The front portion 94 of the frame 82 may be pulled so that the fasteners 104b, 106b slide along the convergent portions 72, 80 of the slots 60, 64, and the fasteners 104a, 106a rotate about a vertical axis. The front portion 94 and therefore the outlets 102 of the patch panels 14, 16 are thereby accessible in the chamber 22.

To access the back portion 96 of the frame body 28 and therefore the fiber ports backsides of the patch panels 14, 16, the locking mechanisms 84, 86 may be unlocked, i.e., the latching devices 124, 126 may be disengaged from the receivers 128, 130. The frame body 28 may be shifted to the back-exposed position. The back portion 96 of the frame 82 may be pulled so that the fasteners 104a, 106a slide along the convergent portions 70, 78 of the slots 58, 62, and the fasteners 104b, 106b rotate about a vertical axis. The back portion 96 and therefore the outlets backsides of the patch panels 14, 16 are thereby accessible in the chamber 22.

To restore the frame body 28 to the stored position, the frame 82 may be pushed so that all the fasteners 104a, 104b, 106a, 106b slide back to their respective parallel portions 66, 68, 74, 76 until the frame body 28 is positioned in the stored position inside the chamber 22. The locking mechanisms 120, 122 may then be engaged to hold the frame body 28 in the stored position, and the door 24 may be closed.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a feature is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Claims Not Limited to Disclosed Embodiments

The preferred forms of the invention described above are to be used as illustration only, and should not be used in a limiting sense to interpret the scope of the present disclosure. Modifications to the exemplary embodiments, set forth above, could be readily made by those skilled in the art without departing from the spirit of the present disclosure.

The inventors hereby state their intent to rely on the Doctrine of Equivalents to determine and assess the reasonably fair scope of the present disclosure as it pertains to any apparatus not materially departing from but outside the literal scope of the disclosure as set forth in the following claims.

We claim:

1. A fiber distribution hub configured to house patch panels, the fiber distribution hub comprising:
    a plurality of walls forming a chamber;
    a door hingedly attached to one of the plurality of walls;
    a cable wrap attached to a first wall of the plurality of walls inside the chamber;
    a first shelf attached to a second wall of the plurality of walls;
    a first pair of tracks configured to be supported on the first shelf and comprising portions that are parallel to one another and portions that are convergent to one another;
    a second shelf attached to the second wall;
    a second pair of tracks configured to be supported on the second shelf and comprising portions that are parallel to one another and portions that are convergent to one another; and
    a frame body configured to shift between a stored position, a front-exposed position, and a back-exposed position, the frame body including:
        a frame for attaching patch panels and having a top portion, a bottom portion, a front portion that protrudes from the chamber when the frame body is in the front-exposed position, and a back portion that protrudes from the chamber when the frame body is in the back-exposed position,
        a pair of top pivot pins attached to the top portion of the frame, the pair of top pivot pins being configured to be slidingly engaged with the first pair of tracks,
        a pair of bottom pivot pins attached to the bottom portion of the frame, the pair of bottom pivot pins being configured to be slidingly engaged with the second pair of tracks, and
        a cable shelf attached to the top portion of the frame above the first shelf, the cable shelf being configured to support fiber optic cables connected to the patch panels away from a path of the frame body.

2. A fiber distribution hub configured to house a patch panel, the fiber distribution hub comprising:
    a plurality of walls forming a chamber;
    a first shelf attached to a first wall of the plurality of walls of the chamber;
    a frame body configured to support the patch panel;
    wherein the first shelf includes a first track;
    wherein the frame body is configured to be coupled with the first shelf via the first track; and
    wherein the first track includes a pair of slots configured to allow the frame body to shift along the first track in a first direction and to allow the frame body to shift along the first track between a stored position, a front-exposed position, and a back-exposed position.

3. The fiber distribution hub according to claim 2, further comprising a cable wrap attached to a second wall of the plurality of walls inside the chamber.

4. The fiber distribution hub according to claim 2, further comprising a door hingedly attached to one of the plurality of walls.

5. The fiber distribution hub according to claim 2, further comprising a power outlet positioned in the inner chamber.

6. The fiber distribution hub according to claim 2, further comprising a second shelf attached to the first wall and a second track supported by the second shelf;
    wherein the frame body is at least partially supported by the second shelf via the second track.

7. The fiber distribution hub according to claim 6, wherein the frame body includes a bottom pivot pin attached to the bottom portion of the frame, the bottom pivot pin being configured to be slidingly engaged with the second track.

8. The fiber distribution hub according to claim 6, wherein the frame body includes a cable shelf attached to the top portion of the frame above the first shelf, the cable shelf being configured to support a fiber connected to the patch panel away from a path of the frame body.

9. The fiber distribution hub according to claim 8, wherein the cable shelf is configured to define a space below the cable shelf that is wide enough to surround the first shelf when the frame body shifts to the stored position.

10. The fiber distribution hub according to claim 2, wherein the frame body includes a frame for attaching the patch panel and having a top portion, a bottom portion, a front portion that protrudes from the chamber when the frame body is in the front-exposed position, and a back portion that protrudes from the chamber when the frame body is in the back-exposed position.

11. The fiber distribution hub according to claim 10, wherein the frame body includes a top pivot pin attached to the top portion of the frame, the top pivot pin being configured to be slidingly engaged with the first track.

12. The fiber distribution hub according to claim 2, wherein each of the pair of slots includes a first portion and a second portion; and
wherein the first portions of the slots are parallel to one another and the second portions are convergent to one another.

13. A frame support assembly configured to support a patch panel, the frame support assembly comprising:
a first shelf including a first track;
a frame body configured to support a patch panel;
wherein the frame body is configured to be coupled with the first shelf via the first track; and
wherein the first track includes a pair of slots configured to allow the frame body to shift along the first track in a first direction and to allow the frame body to shift along the first track between a stored position, a front-exposed position, and a back-exposed position.

14. The frame support assembly according to claim 13, further comprising a second shelf attached to the first wall and a second track supported by the second shelf;
wherein the frame body is at least partially supported by the second shelf via the second track.

15. The frame support assembly according to claim 14, wherein the frame body includes a bottom pivot pin attached to the bottom portion of the frame, the bottom pivot pin being configured to be slidingly engaged with the second track.

16. The frame support assembly according to claim 14, wherein the frame body includes a cable shelf attached to the top portion of the frame above the first shelf, the cable shelf being configured to support a fiber connected to the patch panel away from a path of the frame body.

17. The frame support assembly according to claim 16, wherein the cable shelf is configured to define a space below the cable shelf that is wide enough to surround the first shelf when the frame body shifts to the stored position.

18. The frame support assembly according to claim 13, wherein the frame body includes a frame for attaching the patch panel and having a top portion, a bottom portion, a front portion that protrudes from the chamber when the frame body is in the front-exposed position, and a back portion that protrudes from the chamber when the frame body is in the back-exposed position.

19. The frame support assembly according to claim 18, wherein the frame body includes a top pivot pin attached to the top portion of the frame, the top pivot pin being configured to be slidingly engaged with the first track.

20. The frame support assembly according to claim 13, wherein each of the pair of slots includes a first portion and a second portion; and
wherein the first portions of the slots are parallel to one another and the second portions are convergent to one another.

* * * * *